United States Patent
Ide et al.

(10) Patent No.: US 12,407,012 B2
(45) Date of Patent: Sep. 2, 2025

(54) SOLID ELECTROLYTE ASSEMBLY HAVING INTERMEDIATE LAYER

(71) Applicant: Mitsui Mining & Smelting Co., Ltd., Tokyo (JP)

(72) Inventors: Shingo Ide, Ageo (JP); Kengo Shimanoe, Fukuoka (JP); Ken Watanabe, Fukuoka (JP); Koichi Suematsu, Fukuoka (JP)

(73) Assignee: MITSUI MINING & SMELTING CO., LTD. (JP)

( * ) Notice: Subject to any disclaimer, the term of this patent is extended or adjusted under 35 U.S.C. 154(b) by 108 days.

(21) Appl. No.: 17/045,921

(22) PCT Filed: Apr. 16, 2019

(86) PCT No.: PCT/JP2019/016282
§ 371 (c)(1),
(2) Date: Oct. 7, 2020

(87) PCT Pub. No.: WO2019/203219
PCT Pub. Date: Oct. 24, 2019

(65) Prior Publication Data
US 2021/0036354 A1    Feb. 4, 2021

(30) Foreign Application Priority Data

Apr. 17, 2018 (JP) .................. 2018-079456

(51) Int. Cl.
*H01M 8/1213* (2016.01)
*H01M 4/86* (2006.01)
(Continued)

(52) U.S. Cl.
CPC .......... *H01M 8/1213* (2013.01); *H01M 4/86* (2013.01); *H01M 4/9033* (2013.01);
(Continued)

(58) Field of Classification Search
CPC .... H01M 8/1213; H01M 8/1246; H01M 4/86; H01M 4/9033; H01M 2008/1293; H01M 2300/0074
See application file for complete search history.

(56) References Cited

U.S. PATENT DOCUMENTS

2010/0203421 A1*   8/2010   Park ............... C01G 53/006
                                                977/773
2010/0285391 A1   11/2010   Higuchi et al.
(Continued)

FOREIGN PATENT DOCUMENTS

JP   2009-176675 A   6/2009
JP   2013-051102 A   3/2013
(Continued)

OTHER PUBLICATIONS

Kuo, Y. L. et al., "Tailoring the O2 reaction activity on hydrangea-like $La_{0.5}Sr_{0.5}MnO_3$ cathode film fabricated via atmospheric pressure plasma jet process", Ceramics International, Feb. 8, 2018, vol. 44, pp. 7349-7356.
(Continued)

*Primary Examiner* — Eugenia Wang
(74) *Attorney, Agent, or Firm* — Harness, Dickey & Pierce, P.L.C.

(57) ABSTRACT

A solid electrolyte assembly has an anode, a cathode, and a solid electrolyte layer located therebetween. An intermediate layer is provided between the anode or the cathode and the solid electrolyte layer. The intermediate layer is made of a cerium oxide containing lanthanum and a rare-earth element excluding lanthanum and cerium. The solid electrolyte layer contains an oxide of lanthanum. Preferably, the solid electrolyte layer contains a composite oxide of lanthanum and silicon. Also, preferably, the intermediate layer is made of a cerium oxide containing lanthanum and any one of
(Continued)

samarium, gadolinium, yttrium, erbium, ytterbium, and dysprosium.

14 Claims, 2 Drawing Sheets

(51) Int. Cl.
    *H01M 4/90*     (2006.01)
    *H01M 8/12*     (2016.01)
    *H01M 8/1246*     (2016.01)

(52) U.S. Cl.
    CPC .. *H01M 8/1246* (2013.01); *H01M 2008/1293* (2013.01); *H01M 2300/0074* (2013.01)

(56) References Cited

U.S. PATENT DOCUMENTS

| | | | |
|---|---|---|---|
| 2013/0224628 A1 | 8/2013 | Moon et al. | |
| 2014/0087288 A1 | 3/2014 | Momiyama et al. | |
| 2017/0117566 A1* | 4/2017 | Yoon | H01M 8/126 |
| 2018/0183068 A1 | 6/2018 | Ide et al. | |
| 2018/0198150 A1* | 7/2018 | Kim | H01M 8/1213 |
| 2019/0341640 A1 | 11/2019 | Echigo et al. | |

FOREIGN PATENT DOCUMENTS

| | | | | |
|---|---|---|---|---|
| JP | 2019-057500 A | 4/2015 | | |
| JP | 201658398 A | 4/2016 | | |
| JP | 2016115592 A | 6/2016 | | |
| JP | 2016-152160 A | 8/2016 | | |
| TW | 2018-06223 A | 2/2018 | | |
| WO | WO-2016018106 A1 * | 2/2016 | ............... | H01B 1/08 |
| WO | WO-2016032100 A1 * | 3/2016 | ............... | C01F 17/00 |
| WO | WO-2016111110 A1 * | 7/2016 | ............. | C01B 33/20 |

OTHER PUBLICATIONS

Chesnaud, A. et al., "Densification par spark plasma sintering (SPS) de materiaux d'electrolytes, difficilement densifiables, pour piles a combustible", Materiaux & Techniques, 2007, vol. 95, No. 4, 5, pp. 259-268.

Lu, J. et al., "A cobalt-free electrode material $La_{0.5}Sr_{0.5}Fe_{0.8}Cu_{0.2}O_{3-\delta}$ for symmetrical solid oxide fuel cells", Electrochemistry Communications, 2015, vol. 61, pp. 18-22.

International Search Report (in English and Japanese) issued in PCT/JP2019/016282, mailed Jul. 23, 2019.

\* cited by examiner

SOLID ELECTROLYTE ASSEMBLY HAVING INTERMEDIATE LAYER

CROSS REFERENCE TO RELATED APPLICATIONS

This application is a U.S. National Stage Application of International Application No. PCT/JP2019/016282, filed on Apr. 16, 2019, and claims priority to Japanese Patent Application No. 2018-079456, filed on Apr. 17, 2018 and International PCT Application No. PCT/JP2018/040386, filed on Oct. 30, 2018. The entire disclosures of the above applications are expressly incorporated herein by reference.

BACKGROUND

Technical Field

The present invention relates to an assembly of a solid electrolyte having oxide ion conductivity. The solid electrolyte assembly of the present invention is applicable to various fields in which its oxide ion conductivity is used.

Related Art

Various solid electrolytes having oxide ion conductivity are known. Such solid electrolytes are used as, for example, an oxygen permeable element, a fuel cell electrolyte, a gas sensor, and the like in various fields. For example, JP 2009-176675A and US 2010/0285391A1 disclose electrolyte-electrode assemblies in which an apatite-type oxide is used as the electrolyte. A composite oxide of lanthanum and silicon, the composite oxide being represented by $La_xSi_6O_{1.5X+12}$ and being a single crystal or oriented along the c-axis, is used as the electrolyte. Platinum and an oxide ceramic represented by $La_xSr_{1-X}Co_yFe_{1-y}O_\alpha$, $Ba_xSr_{1-X}Co_yFe_{1-y}O_\alpha$, or $Sm_xSr_{1-X}CoO_\alpha$, are used in the electrodes. Intermediate layers are provided between the electrolyte and the respective electrodes. A cerium oxide in which samarium, yttrium, gadolinium, or lanthanum forms a solid solution is used in the intermediate layers.

Various devices in which solid electrolytes having oxide ion conductivity are used as disclosed in JP 2009-176675A and US 2010/0285391A1 have been proposed, but there is demand to improve the oxide ion conductivity of a device as a whole even more. Also, the device needs to be heated to a temperature suitable for the operation of the solid electrolyte in use, but there is demand to operate the device at a temperature that is as low as possible, in order to shorten the time until activation and reduce the power or the like needed to keep the device warm.

Therefore, an object of the present invention is to improve the oxide ion conductivity of a device including a solid electrolyte even more.

SUMMARY

To achieve the above-described object, the inventors of the present invention conducted in-depth research, and have found that, with a solid electrolyte assembly in which a specific solid electrolyte having oxide ion conductivity is used, and an intermediate layer made of an oxide containing a specific material is disposed between the solid electrolyte and an electrode, the oxide ion conductivity of a device as a whole is improved.

The present invention was made based on the above-described findings, and achieves the above-described object by providing a solid electrolyte assembly including:

an anode, a cathode, and a solid electrolyte located therebetween, wherein an intermediate layer is provided between at least one of the anode and the cathode and the solid electrolyte, the intermediate layer is made of a cerium oxide containing lanthanum and a rare-earth element excluding lanthanum and cerium, and the solid electrolyte contains an oxide of lanthanum.

DETAILED DESCRIPTION

Figure 1:
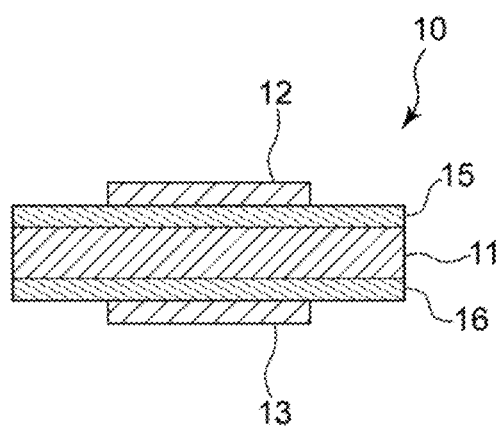
FIG. 1 schematically shows a cross section of an embodiment of a solid electrolyte assembly of the present invention taken along a thickness direction.

Hereinafter, the present invention will be described based on a preferred embodiment thereof, with reference to the drawings. FIG. 1 shows an embodiment of a solid electrolyte assembly of the present invention. A solid electrolyte assembly 10 shown in FIG. 1 includes a layer (hereinafter also referred to as the "solid electrolyte layer") 11 of a solid electrolyte. The solid electrolyte layer 11 is made of a material that has oxide ion conductivity at or above a predetermined temperature. The solid electrolyte layer 11 is located between two electrodes, that is, a cathode 12 and an anode 13. That is to say, the cathode 12 and the anode 13 are respectively disposed on different surface sides of the solid electrolyte layer 11. The cathode 12 can be electrically connected to a negative electrode of a DC power supply (not shown). On the other hand, the anode 13 can be electrically connected to a positive electrode of the DC power supply (not shown). Accordingly, a DC voltage can be applied between the cathode 12 and the anode 13.

A cathode-side intermediate layer 15 is disposed between the cathode 12 and the solid electrolyte layer 11. On the other hand, an anode-side intermediate layer 16 is disposed between the anode 13 and the solid electrolyte layer 11. Although the cathode 12 and the cathode-side intermediate layer 15 having different sizes are shown in FIG. 1, the relationship in size between the cathode 12 and the cathode-side intermediate layer 15 is not limited to this, and, for example, the cathode 12 and the cathode-side intermediate layer 15 may have the same size. The same holds true for the anode 13 and the anode-side intermediate layer 16, and the anode 13 and the anode-side intermediate layer 16 may have the same size, or, for example, the anode-side intermediate layer 16 may have a larger size than the anode 13. Moreover, although the cathode-side intermediate layer 15 and the solid electrolyte layer 11 having the same size are shown in FIG. 1, the relationship in size between the cathode-side intermediate layer 15 and the solid electrolyte layer 11 is not limited to this, and, for example, the solid electrolyte layer 11 and the cathode-side intermediate layer 15 may have different sizes. The same holds true for the anode 13 side.

As shown in FIG. 1, the cathode-side intermediate layer 15 is in direct contact with the cathode 12 and the solid electrolyte layer 11. Accordingly, no layer is present between the cathode-side intermediate layer 15 and the cathode 12. In addition, the cathode-side intermediate layer 15 is also in direct contact with the solid electrolyte layer 11, and no layer is present therebetween. The same holds true for the anode 13 side, and the intermediate layer 16 is in direct contact with the solid electrolyte layer 11 and the anode 13.

The cathode-side intermediate layer 15 and the anode-side intermediate layer 16 (hereinafter the two layers may also be collectively referred to simply as the "intermediate layer", for the sake of convenience) are used to improve the oxide ion conductivity between the solid electrolyte layer 11 and the cathode 12 and/or the anode 13 in the solid electrolyte assembly 10. In order to reduce the electric resistance of the solid electrolyte assembly 10, it is important to improve the oxide ion conductivity of the solid electrolyte layer 11. However, even in the case where a solid electrolyte layer 11 is formed using a material having high oxide ion conductivity, if oxide ion conductivity between the solid electrolyte layer 11 and the anode 13 and/or the cathode 12 is low, there is a limit to improvement in the oxide ion conductivity of the solid electrolyte assembly 10 as a whole. As a result of the research conducted by the inventors of the present invention, it has been found that the oxide ion conductivity of the solid electrolyte assembly 10 as a whole is improved by using a specific solid electrolyte layer 11 having oxide ion conductivity, and disposing an intermediate layer made of an oxide containing a specific material between the solid electrolyte layer 11 and the cathode 12 and/or the anode 13. Specifically, it has been found that, in the case where a solid electrolyte layer 11 containing an oxide of lanthanum is used, ion conductivity improves even more if the cathode-side intermediate layer 15 or the anode-side intermediate layer 16 or both are composed of a cerium oxide containing lanthanum and a rare-earth element excluding lanthanum and cerium. The solid electrolyte layer 11 as well as the cathode-side intermediate layer 15 and the anode-side intermediate layer 16 will be described below.

The solid electrolyte layer 11 containing an oxide of lanthanum is a conductor in which oxide ions serve as carriers. A single crystal material or a polycrystal material is used as the solid electrolyte constituting the solid electrolyte layer 11. In particular, it is preferable to use an oxide of lanthanum as the material constituting the solid electrolyte layer 11, because the oxide ion conductivity can be improved even more. Examples of the oxide of lanthanum include: a composite oxide containing lanthanum and gallium; a composite oxide obtained by adding, to this composite oxide, strontium, magnesium, cobalt, or the like; a composite oxide containing lanthanum and molybdenum; and the like. In particular, it is preferable to use an oxide-ion-conductive material made of a composite oxide of lanthanum and silicon, because this material has high oxide ion conductivity.

An example of the composite oxide of lanthanum and silicon is an apatite-type composite oxide containing lanthanum and silicon. An apatite-type composite oxide that contains lanthanum, which is a trivalent element, silicon, which is a tetravalent element, and O and whose composition is represented by $La_xSi_6O_{1.5x+12}$, where x represents a number that is 8 or greater and 10 or less, has high oxide ion conductivity and is therefore preferably used as the apatite-type composite oxide. In the case where this apatite-type composite oxide is used as the solid electrolyte layer 11, it is preferable that the c-axis of the apatite-type composite oxide matches the thickness direction of the solid electrolyte layer 11. The most preferable composition of this apatite-type composite oxide is $La_{9.33}Si_6O_{26}$. This composite oxide can be produced in accordance with the method disclosed in JP 2013-51101A, for example.

Another example of the material constituting the solid electrolyte layer 11 is a composite oxide represented by the general formula $A_{9.33+x}[T_{6.00-y}M_y]O_{26.0+z}$. This composite oxide also has an apatite-type structure. In the formula, A represents one or two or more elements selected from the group consisting of La, Ce, Pr, Nd, Pm, Sm, Eu, Gd, Tb, Dy, Ho, Er, Yb, Lu, Be, Mg, Ca, Sr, and Ba; T represents an element containing Si or Ge or both; and M represents one or two or more elements selected from the group consisting of Mg, Al, Sc, Ti, V, Cr, Mn, Fe, Co, Ni, Ga, Y, Zr, Ta, Nb, B, Ge, Zn, Sn, W, and Mo. From the viewpoint of improving the c-axis orientation, it is preferable that M is one or two or more elements selected from the group consisting of B, Ge, and Zn.

In the formula, x is preferably −1.33 or greater and 1.50 or less, more preferably 0.00 or greater and 0.70 or less, and even more preferably 0.45 or greater and 0.65 or less, from the viewpoint of improving the degree of orientation and the oxide ion conductivity. In the formula, y is preferably 0.00 or greater and 3.00 or less, more preferably 0.40 or greater and 2.00 or less, and even more preferably 0.40 or greater and 1.00 or less, from the viewpoint of filling the position of the element T in the apatite-type crystal lattice. In the formula, z is preferably −5.00 or greater and 5.20 or less, more preferably −2.00 or greater and 1.50 or less, and even more preferably −1.00 or more and 1.00 or less, from the viewpoint of keeping the electroneutrality in the apatite-type crystal lattice.

In the formula above, the ratio of the number of moles of A to the number of moles of T, or in other words, (9.33+x)/(6.00−y) in the formula above is preferably 1.33 or greater and 3.61 or less, more preferably 1.40 or greater and 3.00 or less, and even more particularly preferably 1.50 or greater and 2.00 or less, from the viewpoint of keeping the spatial occupation ratio in the apatite-type crystal lattice. Note that, in the general formula $A_{9.33+x}[T_{6.00-y}M_y]O_{26.0+z}$, if both T and M contain Ge, then y=0 in the formula (9.33+x)/(6.00−y) above.

Out of composite oxides represented by the formula above, it is preferable to use a composite oxide in which A is lanthanum, that is, $La_{9.33+x}[T_{6.00-y}M_y]O_{26.0+z}$, from the viewpoint of improving the oxide ion conductivity even more. Specific examples of the composite oxide represented by $La_{9.33+x}[T_{6.00-y}M_y]O_{26.0+z}$ include $La_{9.33+x}(Si_{4.70}B_{1.30})O_{26.0+z}$, $La_{9.33+x}(Si_{4.70}Ge_{1.30})O_{26.0+z}$, $La_{9.33+x}(Si_{4.70}Zn_{1.30})O_{26.0+z}$, $La_{9.33+x}(Si_{4.70}W_{1.30})O_{26.0+z}$, $La_{9.33+x}(Si_{4.70}Sn_{1.30})O_{26.0+x}$, $La_{9.33+x}(Ge_{4.70}B_{1.30})O_{26.0+z}$, and the like. A composite oxide represented by the formula above can be produced in accordance with the method disclosed in WO 2016/111110, for example.

From the viewpoint of effectively reducing the electric resistance of the solid electrolyte assembly 10, the thickness of the solid electrolyte layer 11 is preferably 10 nm or greater and 1000 μm or less, more preferably 50 nm or greater and 700 μm or less, and even more preferably 100 nm or greater and 500 μm or less. The thickness of the solid electrolyte layer 11 can be measured using, for example, a stylus profilometer or an electron microscope.

As described above, it is preferable that the intermediate layer is composed of a cerium oxide (hereinafter also referred to as "La-LnDC") containing lanthanum and a rare-earth element excluding lanthanum and cerium. In La-LnDC, the rare-earth element other than lanthanum and cerium is contained in a state of forming a solid solution in which the rare-earth element serves as the solute (dopant) in the cerium oxide ($CeO_2$) serving as the matrix. Here, the rare-earth element, which is the dopant element, is usually present at sites where cerium is located, of the crystal lattice of the cerium oxide such that the sites are replaced with the rare-earth element. Lanthanum is present in a state of being contained in this solid solution of the cerium oxide. That is to say, lanthanum may be present at sites where cerium is located, of the crystal lattice of the cerium oxide such that the sites are replaced with lanthanum, or may be present in crystal grain boundaries of the cerium oxide doped with the rare-earth element.

In La-LnDC constituting the intermediate layer, examples of the rare-earth element with which the cerium oxide is doped include samarium, gadolinium, yttrium, erbium, ytterbium, dysprosium, and the like. These rare-earth elements may be used alone or in a combination of two or more. In particular, it is preferable that the intermediate layer contains a cerium oxide containing lanthanum and samarium or gadolinium, because the oxide ion conductivity of the solid electrolyte assembly 10 as a whole can be improved even more. Note that the intermediate layers 15 and 16 may be composed of the same cerium oxide La-LnDC or different cerium oxides La-LnDC. Moreover, it is also conceivable that one of the cathode-side intermediate layer 15 and the anode-side intermediate layer 16 contains La-LnDC, and the other intermediate layer is composed of another substance.

The proportion of the rare-earth element with which the cerium oxide is doped in La-LnDC, in terms of the atom ratio Ln/Ce of the rare-earth element (Ln) to cerium, is preferably 0.05 or greater and 0.5 or less, more preferably 0.1 or greater and 0.4 or less, and even more preferably 0.2 or greater and 0.3 or less. Setting the extent of doping with the rare-earth element to be within the above-described range makes it possible to improve the oxide ion conductivity between the solid electrolyte layer 11 and the cathode 12 and/or the anode 13.

The value of the ratio Ln/Ce is measured using energy-dispersive X-ray spectroscopy (EDS), an electron probe microanalyzer (EPMA), or the like. Moreover, whether a solid solution of the rare-earth element in the cerium oxide is formed is confirmed using X-ray diffractometry.

In La-LnDC constituting the intermediate layer, lanthanum is contained in order to improve the oxide ion conductivity of the solid electrolyte assembly 10 as a whole. To this end, it is preferable that the value of the ratio La/Ce, which is the atom ratio of lanthanum to cerium in La-LnDC, is set to 0.3 or greater. An excessively large amount of lanthanum will actually reduce the ion conductivity, and therefore, it is preferable that the value of the ratio La/Ce is set to 1.2 or less. The value of the ratio La/Ce is more preferably set to 0.4 or greater and 1.2 or less, and even more preferably set to 0.5 or greater and 1.2 or less. The value of the ratio La/Ce is measured using energy-dispersive X-ray spectroscopy (EDS), an electron probe microanalyzer (EPMA), or the like.

As a result of the research conducted by the inventors of the present invention, it has been found that, when the intermediate layer has a certain thickness or greater, the oxide ion conductivity between the solid electrolyte layer 11 and the cathode 12 and/or the anode 13 can be effectively improved. More specifically, the intermediate layers on the cathode 12 side and the anode 13 side each independently have a thickness of preferably 1 nm or greater and 400 nm or less, and more preferably 5 nm or greater and 350 nm or less. The thickness of the intermediate layer here can be measured using a stylus profilometer or an electron microscope. The thickness of the cathode-side intermediate layer 15 and the thickness of the anode-side intermediate layer 16 may be equal to each other or different from each other.

The cathode 12 and the anode 13, which are arranged in direct contact with the respective intermediate layers, may each independently be composed of, for example, a metal material, or an oxide having oxide ion conductivity. In the case where the cathode 12 and the anode 13 are composed of a metal material, it is preferable that the metal material contains an element belonging to the platinum group, because such elements have advantages such as high catalytic activity. Examples of the element belonging to the platinum group include platinum, ruthenium, rhodium, palladium, osmium, and iridium. These elements may be used alone or in a combination of two or more. Moreover, the anode 13 and the cathode 12 may also each independently formed using a cermet containing an element belonging to the platinum group.

On the other hand, in the case where either the cathode 12 or the anode 13 is composed of an oxide having oxide ion conductivity, an oxide having a perovskite structure represented by $ABO_{3-\delta}$ is favorably used as this oxide, where A represents an alkaline-earth metal element; B represents a transition metal element, and examples include Ti, V, Cr, Mn, Fe, Co, Ni, Cu, Zn, Y, Zr, Nb, Mo, Tc, Ru, Rh, Pd, Ag, Ta, and W; and δ represents a fraction that occurs depending on the valences and amounts of A, B, and O. Various oxides having a perovskite structure represented by $ABO_{3-\delta}$ are known, and it is known that such oxides have various crystal systems such as, for example, cubic, tetragonal, rhombohedral, and orthorhombic crystal systems. Out of these crystal systems, an $ABO_{3-\delta}$ type oxide having a cubic perovskite structure is preferably used as the cathode 12 and/or the anode 13. When a solid electrolyte assembly 10 is formed by directly joining the cathode 12 and/or the anode 13 made of such an oxide to the intermediate layer made of the above-described material, the oxide ion conductivity of the assembly 10 as a whole can be improved even more. In contrast to this, conventional devices having a solid electrolyte layer and electrodes have different crystal systems of the electrodes. For example, even though an oxide having a perovskite structure is used as the material of an electrode in the device disclosed in Patent Literature 1 as well, the oxide has a rhombohedral crystal system.

As a result of the research conducted by the inventors of the present invention, it has been found that, from the viewpoint of improving the oxide ion conductivity of the solid electrolyte assembly 10 as a whole, it is advantageous that the oxide represented by $ABO_{3-\delta}$ contains lanthanum in some of the A sites. Hereinafter, this oxide may also be referred to as the "oxide a". The amount of lanthanum contained in the oxide a, in terms of the atom ratio of lanthanum to all the elements located at the A sites, is preferably 0.01 or greater and 0.80 or less, more preferably 0.05 or greater and 0.80 or less, even more preferably 0.10 or greater and 0.70 or less, yet more preferably 0.15 or greater and 0.70 or less, and most preferably 0.15 or greater and 0.60 or less. The reason why the use of the oxide a improves the oxide ion conductivity is not clear, but the inventors of the present invention consider that, as a result of the oxide a containing lanthanum in some of the A sites, paths along which oxide ions easily migrate may be formed in the oxide a.

Whether or not lanthanum is located in some of the A sites in the oxide represented by $ABO_{3-\delta}$ can be confirmed using X-ray diffractometry. Also, the proportion of lanthanum in all the elements located at the A sites can be measured using energy-dispersive X-ray spectroscopy (EDS), an electron probe microanalyzer (EPMA), or ICP emission spectroscopic analysis.

Similarly, from the viewpoint of improving the oxide ion conductivity of the solid electrolyte assembly 10 as a whole, it is advantageous that, in the oxide represented by $ABO_{3-\delta}$, a portion of the transition metal element at the B sites is constituted by iron. Hereinafter, this oxide may also be referred to as the "oxide b". The amount of iron contained in the oxide b, in terms of the atom ratio of iron to all the transition metal elements located at the B sites, is preferably 0.1 or greater and 1.0 or less, more preferably 0.2 or greater and 1.0 or less, and even more preferably 0.3 or greater and 1.0 or less. The reason why the use of the oxide b improves the oxide ion conductivity is not clear, but the inventors of the present invention consider that, as a result of iron being contained in B sites of the oxide b represented by $ABO_{3-\delta}$, an oxidation-reduction reaction occurs, and this may make it easy for oxide ions to migrate.

Whether or not iron is located at B sites of the oxide represented by $ABO_{3-\delta}$ can be confirmed using X-ray diffractometry. Also, the proportion of iron in all the elements located at the B sites can be measured using energy-dispersive X-ray spectroscopy (EDS), an electron probe microanalyzer (EPMA), or ICP emission spectroscopic analysis.

In the case where the above-described oxide a is used as the material constituting the cathode 12, it is preferable that the alkaline-earth metal element that occupies the A sites is one or more elements selected from the group consisting of barium and strontium, from the viewpoint of improving the oxide ion conductivity of the solid electrolyte assembly 10 as a whole. That is to say, preferably, at least lanthanum and one or more elements selected from the group consisting of barium and strontium are located at the A sites of the oxide a.

On the other hand, it is preferable that a portion of the transition metal element that occupies the B sites of the oxide a includes at least one of the elements belonging to the fourth and fifth periods of the periodic table. In particular, it is preferable that the transition metal element located at the B sites includes at least one element selected from the group consisting of iron, cobalt, nickel and copper, titanium, zirconium, and niobium, and furthermore, from the viewpoint of improving the oxide ion conductivity of the solid electrolyte assembly 10 as a whole, it is more preferable that at least a portion of the transition metal element is constituted by iron. From the same viewpoint, it is particularly preferable that both iron and copper are located at at least some of the B sites.

In the case where iron is located at B sites of the oxide a, from the viewpoints of improving the oxide ion conductivity of the solid electrolyte assembly 10 as a whole and avoiding any influence on the crystal system of the oxide a, the atom ratio of iron to all the elements located at the B sites is preferably 0.05 or greater and 0.95 or less, more preferably 0.10 or greater and 0.90 or less, and even more preferably 0.20 or greater and 0.80 or less. Moreover, in the case where iron and copper are located at B sites of the oxide a, the atom ratio of the sum of iron and copper to all the elements located at the B sites is preferably 0.80 or greater and 1.00 or less, more preferably 0.85 or greater and 1.00 or less, and even more preferably 0.90 or greater and 1.00 or less. In this case, with respect to the atom ratio of iron to copper, the value of the ratio Fe/Cu is preferably 1.00 or greater and 10.0 or less, more preferably 2.00 or greater and 9.50 or less, and even more preferably 5.00 or greater and 9.00 or less. The atom ratios above and the value of the ratio Fe/Cu can be measured using energy-dispersive X-ray spectroscopy (EDS), an electron probe microanalyzer (EPMA), or ICP emission spectroscopic analysis.

In the case where the above-described oxide b is used as the material constituting the cathode 12, it is preferable that at least a portion of the element that occupies the B sites is constituted by iron and copper, from the viewpoint of improving the oxide ion conductivity of the solid electrolyte assembly 10 as a whole, and it is more preferable that only iron and copper are located at the B sites of the oxide b.

On the other hand, it is preferable that the element that occupies the A sites of the oxide b is at least one of barium and strontium in particular, out of the alkaline-earth metal elements, from the viewpoint of improving the oxide ion conductivity of the solid electrolyte assembly 10 as a whole. From the same viewpoint, lanthanum may also be contained at some of the A sites of the oxide b. In particular, it is preferable that lanthanum and one of barium and strontium are located at the A sites of the oxide b.

In the case where lanthanum is located at some of the A sites of the oxide b, the atom ratio of lanthanum to all the elements located at the A sites is preferably 0.01 or greater and 0.80 or less, more preferably 0.05 or greater and 0.80 or less, even more preferably 0.05 or greater and 0.70 or less, yet more preferably 0.10 or greater and 0.70 or less, yet even more preferably 0.10 or greater and 0.60 or less, and most preferably 0.15 or greater and 0.60 or less. This atom ratio can be measured using energy-dispersive X-ray spectroscopy (EDS), an electron probe microanalyzer (EPMA), or ICP emission spectroscopic analysis.

Oxides that are preferable as the oxide a and the oxide b are those represented by the general formula $La_{1-x}A_xBO_{3-\delta}$, where A represents an element including Ba or Sr or both; B represents one or two or more elements selected from Fe, Cu, Ti, Zr, and Nb, or preferably one or two or more elements selected from Fe, Cu, and Zr in particular; and x represents a number that is 0.01 or greater and 0.80 or less.

Oxides that are especially preferable as the oxide a and the oxide b are those described in (i) to (iv) below:
(i) an oxide in which lanthanum and strontium occupy the A sites, and iron, cobalt, and nickel occupy the B sites;
(ii) an oxide in which lanthanum and barium occupy the A sites, and iron occupies the B sites;
(iii) an oxide in which barium occupies the A sites, and iron and copper occupy the B sites; and
(iv) an oxide in which lanthanum and barium occupy the A sites, and iron and copper occupy the B sites.

An oxide, including the oxide a and the oxide b, that constitutes the cathode 12 and/or the anode 13 can be obtained through a breakdown process in which particles are micronized using mechanical energy or a build-up process in which growth of aggregates of atoms or molecules is controlled via chemical reactions. From the viewpoint of reducing the electric resistance, it is preferable to use the build-up process. With the build-up process, it is easy to obtain fine particles, and also the contact area between particles can be increased. Therefore, it is considered that the build-up process can achieve the above-described effects. Specifically, for example, the oxide can be obtained using the following method. That is to say, acetates or nitrates of metals that are mixed in stoichiometric proportions in accordance with the composition of an oxide having a perovskite structure to be obtained, as well as DL-malic acid are dissolved in ion-exchanged water, and aqueous ammonia is added under stirring to adjust the pH to 5 to 6. After that, the solution is evaporated at 350° C., and the resulting powder is pulverized in a mortar. The thus obtained powder is calcined at a temperature of 700° C. to 1000° C. in the air for 5 hours, and pulverized again. Note that the method for obtaining the oxide is not limited to this method.

From the above-described viewpoint, the average particle size of the oxide is preferably 1000 nm or less, more preferably 600 nm or less, even more preferably 300 nm or less, and yet more preferably 200 nm or less. Also, the average particle size of the oxide is preferably 1 nm or greater, more preferably 2 nm or greater, and even more preferably 3 nm or greater. The average particle size can be calculated using an image of particles obtained by observation under a scanning electron microscope as well as a known piece of image analysis software. For example, 10 randomly chosen particles are observed at a magnification of 1,000 to 100,000 to thereby determine the outlines of the particles, and after processing such as contrast enhancement and drawing lines along the outlines is performed as necessary, image analysis is performed, so that the average particle size can be calculated.

Moreover, regarding the contact area between particles of the oxide, the value of the ratio C/D is preferably 0.2 or greater, more preferably 0.4 or greater, and even more preferably 0.6 or greater, where D is the length of the outline of a particle, and C is the length of a portion of the outline that overlaps an adjacent particle. As is the case with the average particle size, the values of C and D can also be calculated using a known piece of image analysis software. To calculate the value of the ratio C/D, first, 10 randomly chosen particles are observed to thereby determine the outlines of the particles, then, portions of the outlines that overlap adjacent particles are visually determined and drawn, and after that, arithmetic mean values of C and D are obtained through image analysis and used to calculate the value of the ratio C/D. The values of C and D of the oxide are the values with respect to not only the oxide that is present in the electrode layer but also the oxide that serves as the raw material powder for forming the electrode layer. As will be described later in Examples, measurement of the values of C and D is performed on a fired product of the oxide.

Furthermore, from the viewpoint of effectively reducing the electric resistance, the value of the ratio P1/P2 of the primary particle size P1 (nm) to the secondary particle size P2 (nm) of the oxide is preferably 0.02 or greater, more preferably 0.03 or greater, and even more preferably 0.04 or greater. Also, the value of the ratio P1/P2 is preferably 0.3 or less, more preferably 0.2 or less, and even more preferably 0.17 or less. Setting the value of the ratio P1/P2 to be within the above-described range enables that oxygen propagation paths are formed while securing the contact area between particles in the oxide, and thus, electric resistance can be reduced even further. The primary particle size P1 and the secondary particle size P2 of the present invention can be obtained through small-angle X-ray scattering (SAXS) measurement. The value of the secondary particle size itself of the oxide is preferably 1 nm or greater, more preferably 2 nm or greater, and even more preferably 3 nm or greater. Also, the secondary particle size is preferably 500 nm or less, more preferably 300 nm or less, and even more preferably 200 nm or less. A "primary particle" refers to a particle that is generated by the growth of a single crystal nucleus, and a "secondary particle" refers to a particle that is present as an aggregate of a plurality of primary particles into which the primary particles are aggregated or sintered, for example. The primary particle size P1 and the secondary particle size P2 of the oxide are values with respect to not only the oxide that is present in the electrode layer but also the oxide that serves as the raw material powder for forming the electrode layer. As will be described later in Examples, measurement of the primary particle size P1 and the secondary particle size P2 is performed on a fired product of the oxide.

As a result of the research conducted by the inventors of the present invention, it has been found that, when the cathode 12 and the anode 13 have predetermined thicknesses, the oxide ion conductivity of the solid electrolyte assembly 10 as a whole can be even more effectively improved. More specifically, the thicknesses of the cathode 12 and the anode 13 that are joined to the intermediate layers are each independently preferably 100 nm or greater, more preferably 500 nm or greater, and even more preferably 1000 nm or greater and 30000 nm or less. The thicknesses of the cathode 12 and the anode 13 can be measured using a stylus profilometer or an electron microscope.

The solid electrolyte assembly 10 of the embodiment shown in FIG. 1 can be favorably produced using, for example, a method described below. First, a solid electrolyte layer 11 is produced using a known method. To produce the solid electrolyte layer 11, for example, the method disclosed in JP 2013-51101A or WO 2016/111110 described above may be used.

Next, a cathode-side intermediate layer 15 and an anode-side intermediate layer 16 are respectively formed on opposing two surfaces of the solid electrolyte layer 11. To form each intermediate layer 15 and intermediate layer 16, for example, sputtering may be used. A target used in the sputtering may be produced using the following method, for example. That is to say, a powder of an oxide of a rare-earth element excluding lanthanum and cerium and a powder of a cerium oxide are mixed using an agitator such as a mortar or a ball mill, and calcined in an oxygen-containing atmosphere to thereby obtain a raw material powder. This raw material powder is shaped into the shape of the target to be obtained, and then sintered by hot pressing. The sintering conditions may be set as follows: temperature: 1000° C. or greater and 1400° C. or less; pressure: 20 MPa or greater and 35 MPa or less; and time: 60 minutes or longer and 180 minutes or shorter. The atmosphere may be an inert gas atmosphere, such as a nitrogen gas atmosphere or a rare gas atmosphere. The sputtering target obtained in this manner is composed of the cerium oxide doped with the rare-earth element excluding lanthanum and cerium (hereinafter this cerium oxide may also be referred to as "LnDC"). Note that the method for producing the sputtering target is not limited to this production method, and, for example, a molded body having the shape of the target may be sintered in the atmosphere or in an oxygen-containing atmosphere.

Sputtered layers are formed on the respective surfaces of the solid electrolyte layer 11 through, for example, high-frequency sputtering using the thus obtained target. The temperature of a substrate may be increased to a temperature within a range of 300 to 500° C. in advance and be kept at this temperature during sputtering. The sputtered layers are composed of LnDC.

After the sputtering has been completed, the sputtered layers are annealed. The annealing is performed in order to diffuse lanthanum contained in the solid electrolyte layer 11 toward the sputtered layers by means of heat and thereby cause lanthanum to be contained in LnDC constituting the sputtered layers. To this end, the annealing conditions may be set as follows: temperature: 1220° C. or greater and 1500° C. or less; and time: 10 minutes or longer and 120 minutes or less, or more preferably, temperature: 1300° C. or greater and 1500° C. or less; and time: 10 minutes or longer and 90 minutes or less. The atmosphere may be an oxygen-containing atmosphere, such as the atmosphere. As other film-forming methods, for example, atomic layer deposition, ion plating, pulsed laser deposition, plating, and the like may be used.

Intermediate layers composed of lanthanum-containing LnDC (La-LnDC) are obtained through the above-described annealing. Then, an anode 13 and a cathode 12 are formed on the surface of the respective intermediate layers. In the case where the cathode 12 and/or the anode 13 is a metal electrode, a paste containing particles of a metal belonging to, for example, the platinum group may be used to form the metal electrode. The paste is applied to the surface of the intermediate layer to form a coating film, the coating film is then fired, and thus, a metal electrode constituted by a porous body is formed. The firing conditions may be set as follows: temperature: 600° C. or greater and 900° C. or less; and time: 30 minutes or longer and 120 minutes or less. The atmosphere may be an oxygen-containing atmosphere, such as the atmosphere.

On the other hand, in the case where the cathode 12 and/or the anode 13 is made of an oxide having oxide ion conductivity, for example, an oxide having a cubic perovskite structure represented by $ABO_{3-\delta}$, which has been described above, the following method may be employed. That is, a slurry containing a powder of the oxide is applied to the surface of the intermediate layer to form a coating film, and the coating films is then fired. The slurry is obtained by, for example, dissolving ethyl cellulose in α-terpineol to form a binder, adding the powder of the oxide to the binder, and adjusting the concentration. The concentration of the oxide powder in the slurry may be, for example, 10 mass % or greater and 40 mass % or less. Regarding the conditions under which the coating film formed by applying this slurry is fired, for example, an oxygen-containing atmosphere, such as the atmosphere, or an inert atmosphere, such as a nitrogen gas atmosphere or an argon gas atmosphere, may be used. The firing temperature is preferably 700° C. or greater and 1200° C. or less, more preferably 800° C. or greater and 1100° C. or less, and even more preferably 900° C. or greater and 1000° C. or less. The firing time is preferably 1 hour or longer and 10 hours or less, more preferably 3 hours or longer and 8 hours or less, and even more preferably 5 hours or longer and 7 hours or less. The cathode-side intermediate layer 15 and the anode-side intermediate layer 16 may be formed at the same time, or may be formed one by one.

The solid electrolyte assembly 10 is obtained in the above-described manner. The thus obtained solid electrolyte assembly 10 can be favorably used as, for example, an oxygen permeable element, a gas sensor, a solid electrolyte fuel cell, or the like by making use of its high oxide ion conductivity. No matter what purpose the solid electrolyte assembly 10 is used for, it is advantageous to use La-LnDC as the intermediate layer 15 on the cathode 12 side, which is the electrode where an oxygen gas reduction reaction occurs. For example, in the case where the solid electrolyte assembly 10 is used as an oxygen permeable element, the cathode 12 is connected to a negative electrode of a DC power supply, the anode 13 is also connected to a positive electrode of the DC power supply, and a predetermined DC voltage is applied between the cathode 12 and the anode 13. As a result, on the cathode 12 side, oxygen receives electrons, and oxide ions are generated. The generated oxide ions migrate through the solid electrolyte layer 11 to reach the anode 13. The oxide ions that have reached the anode 13 release electrons and form oxygen gas. Through such reactions, the solid electrolyte layer 11 is capable of transmitting oxygen gas contained in an atmosphere on the cathode 12 side toward the anode 13 side through the solid electrolyte layer 11. Note that, in addition, a current collecting layer made of a conductive material such as platinum may be formed on at least one of the surface of the cathode 12 and the surface of the anode 13, if necessary.

From the viewpoint of increasing the amount of oxygen gas transmission, it is preferable that the voltage to be applied is set to 0.1 V or greater and 4.0 V or less. When applying a voltage between the electrodes, it is preferable that the solid electrolyte layer 11 has sufficiently high oxide ion conductivity. For example, it is preferable that the oxide ion conductivity has a conductivity of $1.0 \times 10^{-3}$ S/cm or greater. For this purpose, it is preferable to keep the solid electrolyte layer 11 at a predetermined temperature. This temperature varies depending on the material of the solid electrolyte layer 11, but in general, it is preferable that this temperature is set to be within a range of 300° C. or greater and 600° C. or less. When the solid electrolyte assembly 10 is used under this condition, oxygen gas contained in an atmosphere on the cathode 12 side can be transmitted to the anode 13 side through the solid electrolyte layer 11.

In the case where the solid electrolyte assembly 10 is also used as a limiting current oxygen sensor, a current is generated due to oxide ions generated on the cathode 12 side migrating to the anode 13 side via the solid electrolyte layer 11. The current value depends on the oxygen gas concentration on the cathode 12 side, and therefore, the oxygen gas concentration on the cathode 12 side can be measured by measuring the current value.

Although the present invention has been described based on the preferred embodiment above, the present invention is not limited to the foregoing embodiment. For example, in the foregoing embodiment, the intermediate layers are disposed both between the cathode 12 and the solid electrolyte layer 11 and between the anode 13 and the solid electrolyte layer 11, but instead, an intermediate layer may be disposed only between the cathode 12 and the solid electrolyte layer 11, or an intermediate layer may be disposed only between the anode 13 and the solid electrolyte layer 11. If an intermediate layer is to be provided for only one of the cathode 12 and the anode 13, it is preferred that an intermediate layer is disposed only between the cathode 12 and the solid electrolyte layer 11, from the viewpoint of effectively improving the oxide ion conductivity of the solid electrolyte assembly 10 as a whole.

EXAMPLES

Hereinafter, the present invention will be described in greater detail by means of examples. However, the scope of the present invention is not limited to the examples below. In the following description, "%" means "mass %" unless otherwise specified.

Example 1

In the present example, a solid electrolyte assembly 10 shown in FIG. 1 was produced by performing steps (1) to (4) below.
(1) Production of Solid Electrolyte Layer 11
A $La_2O_3$ powder and an $SiO_2$ powder were blended in a mole ratio of 1:1. Then, ethanol was added thereto, followed by mixing using a ball mill. The mixture was dried, pulverized in a mortar, and calcined at 1650° C. in an atmosphere of air for 3 hours using a platinum crucible. To this calcined product, ethanol was added, and pulverization was performed using a planetary ball mill, to obtain a calcined powder. This calcined powder was placed into a mold having a diameter of 20 mm and uniaxially molded by applying pressure from one direction. Furthermore, cold isostatic pressing (CIP) was performed at 600 MPa for 1 minute to thereby form a pellet. This pellet-shaped molded body was heated at 1600° C. in the air for 3 hours to obtain a pellet-shaped sintered body. This sintered body was subjected to an X-ray diffraction measurement and a chemical analysis, and was confirmed to have the structure of $La_2SiO_5$.

Then, 800 mg of the obtained pellet and 140 mg of a $B_2O_3$ powder were placed into a saggar with a lid, and heated, with use of an electric furnace, at 1550° C. (temperature of the atmosphere within the furnace) in the air for 50 hours, to thereby generate $B_2O_3$ vapor in the saggar and react the $B_2O_3$ vapor with the pellet, and thus, a solid electrolyte layer 11 to be produced was obtained. This solid electrolyte layer 11 was a compound represented by $La_{9.33+x}[Si_{6.00-y}B_y]O_{26.0+z}$, where x=0.50, y=1.17, and z=0.16 and the mole ratio between La and B was 8.43 (hereinafter this compound will be abbreviated as "LSBO"). The oxide ion conductivity at 600° C. was $6.3 \times 10^{-2}$ S/cm. The thickness of the solid electrolyte layer 11 was 350 μm.

(2) Production of Cathode-Side Intermediate Layer 15 and Anode-Side Intermediate Layer 16

A $Sm_{0.2}Ce_{1.8}O_2$ powder was placed into a mold having a diameter of 50 mm, uniaxially molded by applying pressure from one direction, and subsequently sintered by hot pressing. Regarding the sintering conditions, the sintering was performed in a nitrogen gas atmosphere at a pressure of 30 MPa and a temperature of 1200° C. for 3 hours. In this manner, a sputtering target was obtained. With the obtained target, sputtering was performed onto surfaces of the solid electrolyte layer 11 made of LSBO through a high-frequency sputtering method, and thus, sputtered layers of the cerium oxide doped with samarium (hereinafter this cerium oxide may also be referred to as "SDC") were formed. The sputtering was performed under the conditions of an RF output of 30 W and an argon gas pressure of 0.8 Pa. After the sputtering was completed, annealing was performed at 1400° C. in the air for 1 hour to thermally diffuse lanthanum contained in LSBO toward the sputtered layers and thereby cause lanthanum to be contained in SDC. In this manner, a cathode-side intermediate layer 15 and an anode-side intermediate layer 16 made of lanthanum-containing SDC (hereinafter this SDC may also be referred to as "La-SDC") were produced. Both of the intermediate layers 15 and 16 had a thickness of 300 nm. The element ratio of La/Ce and the element ratio of Sm/Ce in each of the cathode-side intermediate layer 15 and the anode-side intermediate layer 16 were as shown in Table 1 below.

(3) Production of Cathode 12 and Anode 13

A powder of $La_{0.6}Sr_{0.4}Co_{0.78}Fe_{0.2}Ni_{0.2}O_{3-\delta}$ (hereinafter also referred to as "LSCFN") having a cubic perovskite structure was used as an oxide constituting a cathode 12 and an anode 13. This oxide was obtained in the following manner. First, lanthanum nitrate, strontium nitrate, cobalt nitrate, iron nitrate, and nickel nitrate, as well as DL-malic acid were dissolved in ion-exchanged water, and aqueous ammonia was added thereto under stirring to adjust the pH to about 5.0 to 6.0. Then, the solution was evaporated at about 350° C., to obtain a powder (build-up process). The obtained powder was pulverized in a mortar. The thus obtained powder was calcined at 900° C. in the air for 5 hours, and thus, an LSCFN powder to be obtained was produced. Based on X-ray diffraction peaks, it was confirmed that LSCFN was a single phase of a perovskite structure represented by a cubic crystal $ABO_{3-\delta}$.

The LSCFN powder was dispersed in a binder obtained by dissolving ethyl cellulose in α-terpineol, to thereby prepare a 25 mass % paste. This paste was applied to the surfaces of the solid electrolyte layer 11 to form coating films. The coating films were fired at 900° C. in an atmosphere of air for 5 hours, to obtain a cathode 12 and an anode 13 made of a porous body. Both the cathode 12 and the anode 13 had a thickness of 20 μm.

Figure 2:
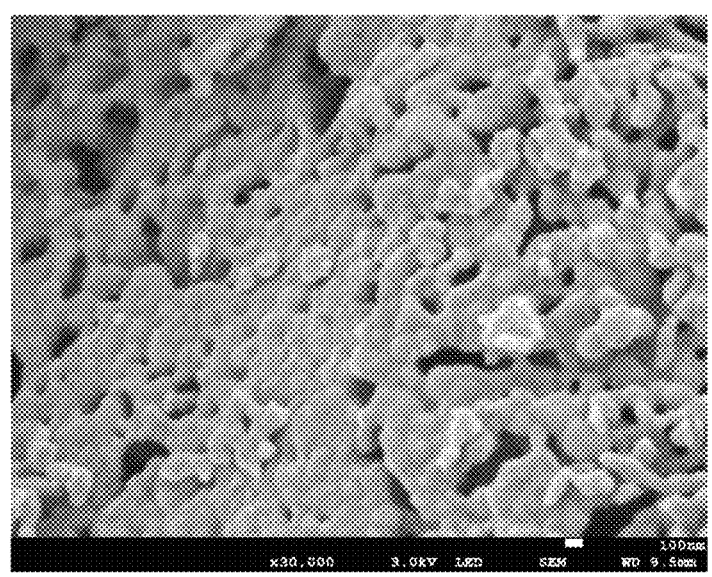
FIG. 2 shows a scanning electron microscope image of LSCFN powder used in electrode layers of Example 1.

Various evaluations were performed using a fired product obtained by firing the LSCFN powder. The average particle size of LSCFN calculated using a piece of image analysis software ImageJ was 188 nm, and the value of the ratio C/D was 0.78, where D is the length of the outline of a particle, and C is the length of a portion of the outline that overlaps an adjacent particle. The primary particle size P1 and the secondary particle size P2 were obtained by performing an analysis on data from small-angle X-ray scattering measurement under the conditions described below, using a piece of software "NANO-Solver" available from Rigaku Corporation. Slit correction was performed; background processing was performed using the results of measurement that was performed without a specimen; and the following were assumed: the scatterer model was a sphere, and variations in size followed the gamma function. In refinements, the analysis area was set to 0.14 to 1.4 deg., and the background was also refined. Moreover, assuming that the scatterer model had two particle size distributions, the primary particle size P1 and the secondary particle size P2 were calculated. Values obtained from a scanning electron microscope image were used as initial values, and the refinement procedure was as follows: first, refinement was performed within 0.14 to 0.5 deg., then, refinement was performed within 0.14 to 1.0 deg., and finally, refinement was performed within 0.14 to 1.4 deg. In the refinements of the respective angular ranges, each refinement was performed until a sufficiently converged state was achieved in which variations in analysis values were small. FIG. 2 shows a scanning electron microscope image of the LSCFN powder (after fired) used in the first electrode layer 12 and the second electrode layer 13.

The conditions under which the LSCFN powder was fired were as follows. The firing atmosphere was air. The firing temperature was 900° C. The firing time was 5 hours. The rate of temperature increase was 200° C./min. The rate of temperature decrease was 300° C./min.

Small-Angle X-Ray Scattering Measurement Conditions
  Device name: "SmartLab" available from Rigaku Corporation
  Scan axis: 2θ
  Scan range: 0 to 4 deg.
  Scan speed: 0.1 deg./min.
  Step width: 0.02 deg.
  Optical system: specifications for small-angle scattering
  Specimen position: The powder specimen was held using Kapton tape, and measured in transmission.

(4) Production of Current Collecting Layers

A platinum paste was applied to the surfaces of the cathode 12 and the anode 13 to form coating films. These coating film was fired at 700° C. in the atmosphere for 1 hour, to obtain current collecting layers. In this manner, a solid electrolyte assembly 10 was produced.

Example 2

In step (3) of Example 1, instead of LSCFN, $Ba_{0.95}La_{0.05}FeO_{3-\delta}$ (hereinafter also referred to as "BLF")

having a cubic perovskite structure was used. Based on X-ray diffraction peaks, it was found that this oxide was a single phase of the perovskite structure represented by a cubic crystal $ABO_{3-\delta}$. Otherwise, a similar procedure to that of Example 1 was performed, and a solid electrolyte assembly 10 was obtained.

Example 3

In step (3) of Example 1, instead of LSCFN, $BaFe_{0.5}Cu_{0.5}O_{3-\delta}$ (hereinafter also referred to as "BFC") having a cubic perovskite structure was used. Based on X-ray diffraction peaks, it was confirmed that this oxide was a single phase of the perovskite structure represented by a cubic crystal $ABO_{3-\delta}$. Otherwise, a similar procedure to that of Example 1 was performed, and a solid electrolyte assembly 10 was obtained.

Example 4

In step (3) of Example 1, instead of LSCFN, $Ba_{0.85}La_{0.15}Fe_{0.9}Cu_{0.1}O_{3-\delta}$ (hereinafter also referred to as "BLFC0.1") having a cubic perovskite structure was used. Based on X-ray diffraction peaks, it was confirmed that this oxide was a single phase of the perovskite structure represented by a cubic crystal $ABO_{3-\delta}$. Otherwise, a similar procedure to that of Example 1 was performed, and a solid electrolyte assembly 10 was obtained.

Example 5

In step (3) of Example 1, instead of LSCFN, $Ba_{0.5}La_{0.5}Fe_{0.55}Cu_{0.45}O_{3-\delta}$ (hereinafter also referred to as "BLFC0.45") having a cubic perovskite structure was used. Based on X-ray diffraction peaks, it was confirmed that this oxide was a single phase of the perovskite structure represented by a cubic crystal $ABO_{3-\delta}$. Otherwise, a similar procedure to that of Example 1 was performed, and a solid electrolyte assembly 10 was obtained.

Example 6

In Example 1, instead of $Sm_{0.2}Ce_{1.8}O_2$ used in step (2), $Gd_{0.2}Ce_{1.8}O_2$ was used, and a cathode-side intermediate layer 15 and an anode-side intermediate layer 16 composed of a cerium oxide containing lanthanum and doped with gadolinium (hereinafter this cerium oxide may also be referred to as "La-GDC") were produced. Otherwise, a similar procedure to that of Example 1 was performed, and a solid electrolyte assembly 10 was obtained. The element ratio of La/Ce and the element ratio of Gd/Ce in each of the cathode-side intermediate layer 15 and the anode-side intermediate layer 16 were as shown in Table 1 below.

Example 7

In Example 1, annealing in step (2) was performed at 1400° C. for 10 minutes. Otherwise, a similar procedure to that of Example 1 was performed, and a solid electrolyte assembly 10 was obtained.

Comparative Example 1

In Example 1, annealing in step (2) was performed at 1200° C. for 2 hours. As a result of a quantitative analysis using energy-dispersive X-ray spectroscopy (EDS), La was not detected in the cathode-side intermediate layer 15 and the anode-side intermediate layer 16. Accordingly, the cathode-side intermediate layer 15 and the anode-side intermediate layer 16 were composed of SDC. Moreover, in step (3), platinum was used instead of LSCFN. In order to form electrodes made of platinum, a platinum paste was applied to the surfaces of the cathode-side intermediate layer 15 and the anode-side intermediate layer 16 and fired at 900° C. for 1 hour. Otherwise, a similar procedure to that of Example 1 was performed, and a solid electrolyte assembly was obtained.

Comparative Example 2

In Example 1, instead of $Sm_{0.2}Ce_{1.8}O_2$ used in step (2), $La_{0.2}Ce_{1.8}O_2$ was used, and a cathode-side intermediate layer and an anode-side intermediate layer composed of a cerium oxide doped with lanthanum (hereinafter this cerium oxide may also be referred to as "LDC") were produced. Moreover, annealing in step (2) was not performed. Moreover, in step (3), platinum was used instead of LSCFN. In order to form electrodes made of platinum, a platinum paste was applied to the surfaces of the cathode-side intermediate layer 15 and the anode-side intermediate layer 16 and calcined at 900° C. for 1 hour. Otherwise, a similar procedure to that of Example 1 was performed, and a solid electrolyte assembly 10 was obtained. The element ratio of La/Ce in each of the cathode-side intermediate layer and the anode-side intermediate layer was as shown in Table 1 below.

Comparative Example 3

Figure 3:
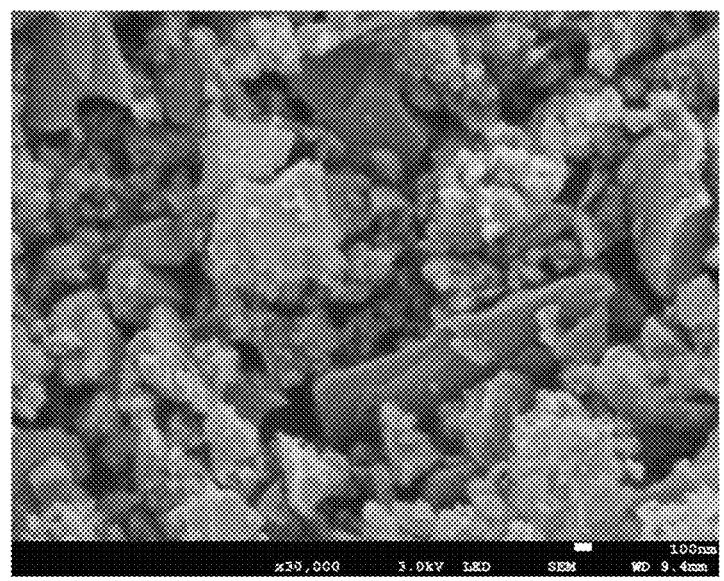
FIG. 3 shows a scanning electron microscope image of LSCF powder used in electrode layers of Comparative Example 3.

In step (3) of Example 1, instead of LSCFN, $La_{0.5}Sr_{0.4}Co_{0.2}Fe_{0.8}O_{3-\delta}$ (hereinafter also referred to as "LSCF") that was produced using a solid phase reaction method and had a rhombohedral perovskite structure was used. A lanthanum oxide powder, a strontium carbonate powder, a cobalt oxide powder, and an iron oxide powder were used as starting materials. These powders were weighed and mixed in stoichiometric proportions, and the mixture was calcined at 1200° C. for 3 hours. After the calcining, the calcined product was pulverized for 1 hour using a ball mill, to obtain LSCF (breakdown process). Otherwise, a similar procedures to that of Example 1, and thus, a solid electrolyte assembly was obtained. FIG. 3 shows a scanning electron microscope image of the LSCF powder used in the first electrode layer 12 and the second electrode layer 13.

Evaluation

The current densities of the solid electrolyte assemblies obtained in the examples and the comparative examples were measured using the following method. Table 1 below shows the results.

Measurement of Current Density

Measurement was performed at 600° C. However, for Example 1, measurement was also performed at 500° C. and 400° C. A direct current of 0.5 V was applied between the current collectors of the solid electrolyte assembly in the atmosphere, and the current density was measured.

TABLE 1

| | Solid electrolyte layer | Anode-side and cathode-side intermediate layers | | Anode and cathode | Average particle size (nm) | Length (D) of outline/ Length (C) of overlapping portion | Primary particle size P1 (nm) | Secondary particle size P2 (nm) | Particle size ratio P1/P2 | Current density (mA/cm$^2$) | | |
| | | Composition | Atom ratio of La/Ce | Atom ratio* of Sm/Ce | | | | | | | DC 0.5 V 600 °C. | DC 0.5 V 500 °C. | DC 0.5 V 400 °C. |
|---|---|---|---|---|---|---|---|---|---|---|---|---|---|
| Ex. 1 | LSBO | La-SDC | 1.1 | 0.1 | LSCFN | 188 | 0.78 | 8.6 | 90.5 | 0.095 | 161.0 | 24.0 | 1.1 |
| Ex. 2 | LSBO | La-SDC | 1.1 | 0.1 | BLF | — | — | 7.2 | 91.7 | 0.078 | 51.2 | — | — |
| Ex. 3 | LSBO | La-SDC | 1.1 | 0.1 | BFC | — | — | 7.7 | 187.6 | 0.041 | 76.6 | — | — |
| Ex. 4 | LSBO | La-SDC | 1.1 | 0.1 | BLFC0.1 | — | — | 9.9 | 132.8 | 0.075 | 119.0 | — | — |
| Ex. 5 | LSBO | La-SDC | 1.1 | 0.1 | BLFC0.45 | — | — | — | — | — | 152.0 | — | — |
| Ex. 6 | LSBO | La-SDC | 0.8 | 0.1 | LSCFN | 188 | 0.78 | 8.6 | 90.5 | 0.095 | 45.1 | — | — |
| Ex. 7 | LSBO | La-SDC | 0.4 | 0.1 | LSCFN | 188 | 0.78 | 8.6 | 90.5 | 0.095 | 57.8 | — | — |
| Com. Ex. 1 | LSBO | SDC | — | 0.1 | Pt | — | — | — | — | — | 0.8 | — | — |
| Com. Ex. 2 | LSBO | LDC | 0.1 | — | Pt | — | — | — | — | — | 1.0 | — | — |
| Com. Ex. 3 | LSBO | SDC | 1.1 | 0.1 | LSCF | — | — | 9.3 | 594.0 | 0.016 | 15.3 | — | — |

*For Ex. 6, the atom ratio of Gd/Ce is shown. For Com. Ex. 2, the atom ratio of La/Ce is shown.

As is clear from the results shown in Table 1, it can be seen that the solid electrolyte assemblies obtained in the examples achieved higher current densities at 600° C. than those of Comparative Examples 1 to 3. That is to say, in each of the examples, the oxide ion conductivity of the solid electrolyte assembly as a whole was high, and therefore it can be seen that the electric resistance of the solid electrolyte assembly was reduced. Moreover, it can be seen that, in the solid electrolyte assembly obtained in Example 1, a current was generated even at 500° C. and 400° C. That is to say, it can be seen that the solid electrolyte assembly obtained in Example 1 was operable even at temperatures lower than 600° C.

INDUSTRIAL APPLICABILITY

According to the present invention, oxide ion conductivity of a device including a solid electrolyte is improved.

The invention claimed is:

1. A solid electrolyte assembly comprising:
   an anode, a cathode, and a solid electrolyte located therebetween,
   wherein an intermediate layer is provided between at least one of the anode and the cathode and the solid electrolyte,
   the intermediate layer is made of a cerium oxide containing lanthanum and a rare-earth element Ln, and the rare-earth element Ln represents samarium or gadolinium,
   an atom ratio Ln/Ce in the cerium oxide containing lanthanum and the rare-earth element Ln is in a range of 0.2 to 0.5,
   an atom ratio La/Ce in the cerium oxide containing lanthanum and the rare-earth element Ln is in a range of 0.5 to 1.2,
   the solid electrolyte contains an oxide of lanthanum, and either the anode or the cathode is composed of an oxide, the oxide has a perovskite structure of $ABO_{3-\delta}$ having an A site and a B site, and a combination of the A site and the B site is one of:
   (i) the A site consisting of lanthanum and strontium, and the B site consisting of iron, cobalt, and nickel;
   (ii) the A site consisting of lanthanum and barium, and the B site consisting of iron;
   (iii) the A site consisting of barium, and the B site consisting of iron and copper; and
   (iv) the A site consisting of lanthanum and barium, and the B site consisting of iron and copper, and
   wherein a value of a ratio P1/P2 is 0.04 or greater and 0.095 or less, where the ratio P1/P2 is a ratio of a primary particle size P1 (nm) to a secondary particle size P2 (nm), and the primary particle size P1 and the secondary particle size P2 are obtained through small-angle X-ray scattering measurement of the oxide having the perovskite structure, and
   at least one of the anode and the cathode is made of a porous body.

2. The solid electrolyte assembly as set forth in claim 1, wherein the solid electrolyte contains a composite oxide of lanthanum and silicon.

3. The solid electrolyte assembly as set forth in claim 2, wherein each of the anode and the cathode is made of the porous body.

4. The solid electrolyte assembly as set forth in claim 1, wherein the solid electrolyte contains a composite oxide represented by the general formula $A_{9.33+x}[T_{6.00-y}M_y]O_{26.0+z}$, where A represents one or two or more elements selected from the group consisting of La, Ce, Pr, Nd, Pm, Sm, Eu, Gd, Tb, Dy, Ho, Er, Yb, Lu, Be, Mg, Ca, Sr, and Ba, T represents an element including Si or Ge or both, and M represents one or two or more elements selected from the group consisting of Mg, Al, Sc, Ti, V, Cr, Mn, Fe, Co, Ni, Ga, Y, Zr, Ta, Nb, B, Ge, Zn, Sn, W, and Mo, and where x represents a number that is −1.33 or greater and 1.50 or less, y represents a number that is 0.00 or greater and 3.00 or less, z represents a number that is −5.00 or greater and 5.20 or less, and a ratio of the number of moles of A to the number of moles of T is 1.33 or greater and 3.61 or less.

5. The solid electrolyte assembly as set forth in claim 4, wherein each of the anode and the cathode is made of the porous body.

6. The solid electrolyte assembly as set forth in claim 1, wherein the intermediate layer is provided between the anode and the solid electrolyte and between the cathode and the solid electrolyte.

7. The solid electrolyte assembly as set forth in claim 6, wherein each of the anode and the cathode is made of the porous body.

8. The solid electrolyte assembly as set forth in claim 1,
wherein the oxide having the perovskite structure has an average particle size of 1000 nm or less,
the average particle size is obtained based on an image of particles of the oxide, and the image is taken by a scanning electron microscope, and
a value of a ratio C/D is 0.2 or greater, where D is a length of an outline of a particle of the oxide having the perovskite structure, and C is a length of a portion of the outline that overlaps an adjacent particle.

9. The solid electrolyte assembly as set forth in claim 8, wherein each of the anode and the cathode is made of the porous body.

10. The solid electrolyte assembly as set forth in claim 1,
wherein the oxide having the perovskite structure has an average particle size of 1000 nm or less, and
the average particle size is obtained based on an image of particles of the oxide, and the image is taken by a scanning electron microscope.

11. The solid electrolyte assembly as set forth in claim 10, wherein each of the anode and the cathode is made of the porous body.

12. The solid electrolyte assembly as set forth in claim 1,
wherein the perovskite structure of $ABO_{3-\delta}$ is represented by the general formula $La_{1-x}A'_xBO_{3-\delta}$, where:
an A' site is one of:
(v) the A' site consisting of strontium; and
(vi) the A' site consisting of barium; and
x represents a number that is 0.01 or greater and 0.80 or less.

13. The solid electrolyte assembly as set forth in claim 12, wherein each of the anode and the cathode is made of the porous body.

14. The solid electrolyte assembly as set forth in claim 1, wherein each of the anode and the cathode is made of the porous body.

* * * * *